Sept. 19, 1961     O. LINDHEIM     3,000,236
SAW-SHARPENING MACHINE
Filed Aug. 27, 1959     3 Sheets-Sheet 3

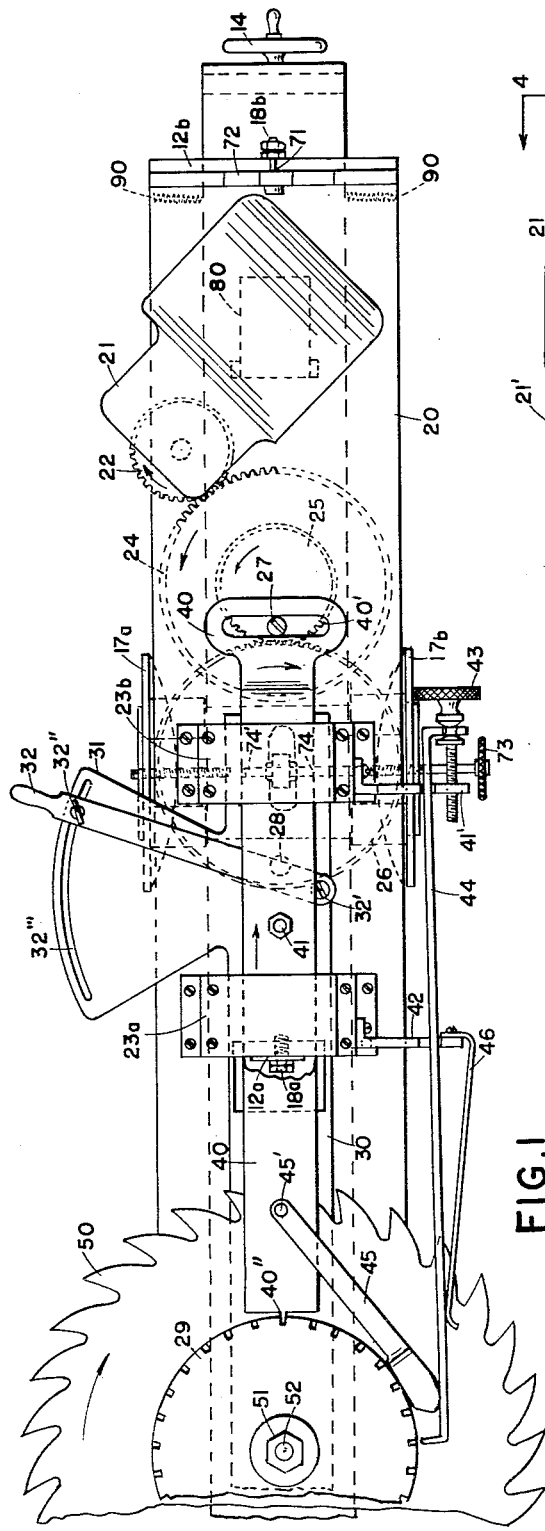

Ottar Lindheim
INVENTOR.

BY

AGENT.

United States Patent Office 3,000,236
Patented Sept. 19, 1961

3,000,236
SAW-SHARPENING MACHINE
Ottar Lindheim, 819 58th St., Brooklyn, N.Y.
Filed Aug. 27, 1959, Ser. No. 836,412
6 Claims. (Cl. 76—43)

My present invention relates to saw-sharpening machines and, more particularly, to machines for grinding circular saws of various diameters such as are used for cutting wood, soft metals, synthetics and the like.

Saws of the above nature commonly require the fleaming of alternate teeth in opposite directions, the grinding of a partial flat on the front of each tooth, and the grinding or shaping of the rear portion of each tooth to provide back rake. Machines for accomplishing the above have hitherto required complex and expensive electrical or mechanical means to insure proper coordination of several cutting or grinding elements. Simple machines have also been designed heretofore which could perform one or another of the above operations but were not capable of a complete saw-sharpening operation.

It is the main object of my present invention, therefore, to provide a saw-sharpening machine, of relatively uncomplicated and inexpensive construction, adapted to grind successive teeth of a circular saw automatically, without remounting and with a minimum of attention from an operator.

A more specific object of the invention is the provision of a saw-sharpening machine having improved means for automatically grinding the side rake or fleam of successive teeth on alternate sides of a blade.

A still more specific object of my invention is the provision of a machine of this character having means adapted to step the saw blade in such fashion as to present successive teeth to a grinding wheel.

According to one feature of my invention I provide a swivel plate upon which the saw blade is secured, this plate being tiltable to either side by a camming mechanism suitably synchronized with a stepping drive for intermittently rotating the blade between grinding operations. The stepping drive, in accordance with another feature of my invention, comprises an indexing member, such as a notched disc, rotatable in unison with the saw blade to be sharpened and provided with an angular division equal to the number of teeth in the blade. Advantageously, pursuant to a more specific feature, the notches or other indexing formations of this member are positioned substantially at the centers of curvature of the arcuate flanks of respective saw teeth whereby, upon the engagement of such indexing formation by a stationary detent such as a pawl, translational movement of the unit carrying both blade and the indexing member will cause a fixed point at the periphery of the blade to move relatively to it along an arc corresponding to the tooth flank so as to enable the sharpening and shaping of such flank by a grinding wheel journaled in stationary bearings. The slidable and tiltable blade-supporting unit also co-operates with a control device, advantageously coupled with that unit via a lost-motion connection, which locks the saw blade against rotation during part of each operating cycle and simultaneously disengages the indexing member from its detent so as to enable the blade to perform a linear motion relative to the grinding wheel, this motion serving to sharpen the generally radial cutting edge of the tooth with the proper fleam angle as established by the concurrent tilting of the blade by means of the aforementioned camming mechanism.

The above and additional features, objects and advantages of an automatic sharpening machine according to my invention will become more readily apparent from the following description, reference being made to the accompanying drawing in which:

FIGS. 1 and 1A are top-plan views of complementary portions of a saw-sharpening machine according to my present invention;

FIGS. 2 and 2A are complementary side-elevational views of the machine shown in FIGS. 1 and 1A;

Figure 2A:
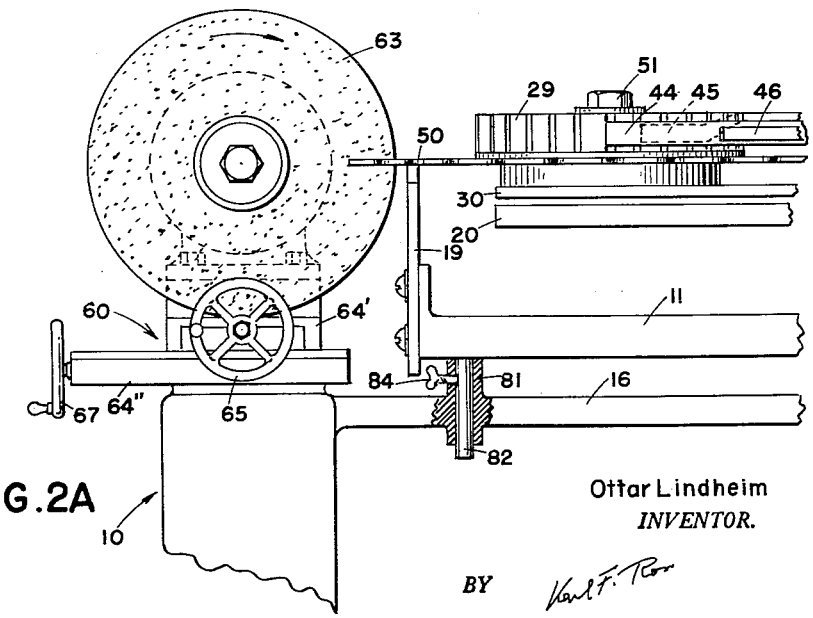

The embodiment shown in the drawing represents a grinding machine having a base 10 (best seen in FIGS. 2, 2A) with a beam 16 supporting a rail 11 upon which there are slidably mounted two swivel risers 12a, 12b, of triangular configuration, rigidly interconnected by a rod 13. Riser 12b is threadedly engaged by a spindle 15 which is controlled by a hand wheel 14 and journaled in rail 11. Rail 11 rests on a rear ledge 83 of beam 16 and is swingable about a fulcrum formed by a depending pin 82 adapted to be immobilized in its socket 81 on beam 16, in a selected rail position, by a locking screw 84. Two tripper cams 17a, 17b, secured to rod 13, are slidably carried on rail 11 which also mounts a blade rest 19 and a backing plate 80. A rockable cradle in the form of a platform 20, tiltable about pivots 18a, 18b on risers 12a, 12b against a ball check 89 and restoring springs 90, supports a motor 21 and a blade-mounting plate 30 slidable within retaining brackets 23a, 23b on platform 20. A drive gear 22, operated from motor 21 through a speed reducer 21', engages a gear train comprising gears 24, 25 and 26 journaled in platform 20. Gear 24 carries an eccentrically depending pin 27; a second eccentric pin 28 projects downwardly from gear 26.

Blade-mounting plate 30 is provided with a sector-shaped feed-adjustment indicator 31 and an adjustment lever 32 pivotally secured at 32' to plate 30. Lever 32 is further provided with a locking wing nut 32" which passes through an arcuate slot 32''' in indicator sector 31 for holding the lever in a selected position. A slider 40, having at its rear extremity a slot 40' adapted to receive pin 27, has at its forward extremity a projection 40" adapted to register with a notched blade-stepping disc 29 and is slidably mounted above plate 30 within brackets 23a, 23b. A pin 41, rigidly secured to plate 40, is adapted to contact the lever 32 which acts as a stop for slider 40. A stepping pawl 44, adapted to engage the notches of disc 29, is adjustably secured to bracket 23b via an arm 41' and an adjustment screw 43. Pawl 44 is further supported by an arm 42 which also serves to support a spring 46 urging pawl 44 toward disc 29. A pusher arm 45 is pivotally secured at 45' to slider 40.

Figure 1A:
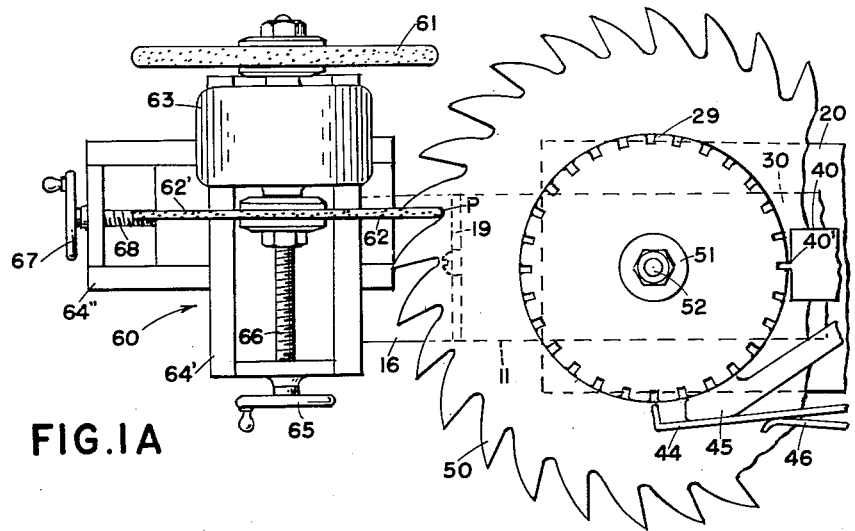

Each notch of disc 29 is aligned with a tooth of a saw blade 50 along a radius of this blade. A bolt 52 and a nut 51 rotatably secure disc 29 and blade 50 to plate 30. A grindstone assembly 60, comprising grinding wheels 61 and 62 of different thicknesses (best seen in FIGS. 1A, 2A) driven by a motor 63, is located at the front end of the apparatus. Motor 63 is supported for transverse motion on a carriage 64', provided with a handwheel 65 on a threaded spindle 66, and for longitudinal motion by a carriage 64", provided with a similar handwheel 67 on a threaded spindle 68.

Figure 4:
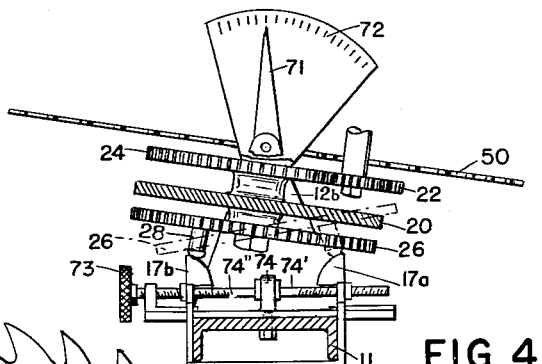
FIG. 4 is a cross-sectional view taken substantially along line 4—4 of FIG. 2 and illustrating the tilting action of the machine.

The machine also includes a fleam-angle (side-rake) indicator, comprising a pointer 71 rigid with riser 12b and a sector scale 72 secured to platform 20, to indicate the angle of tilt of platform 20 and therefore the angle of fleam. The tilt angle may be adjusted by the mechanism best shown in FIG. 4. This mechanism comprises a handwheel 73 and a spindle with oppositely threaded portions 74', 74" journaled in a bearing 74 slidable in a longitudinal slot of rail 11, these spindle portions being matingly received in the tripper cams 17a and 17b, respectively.

Figure 5:
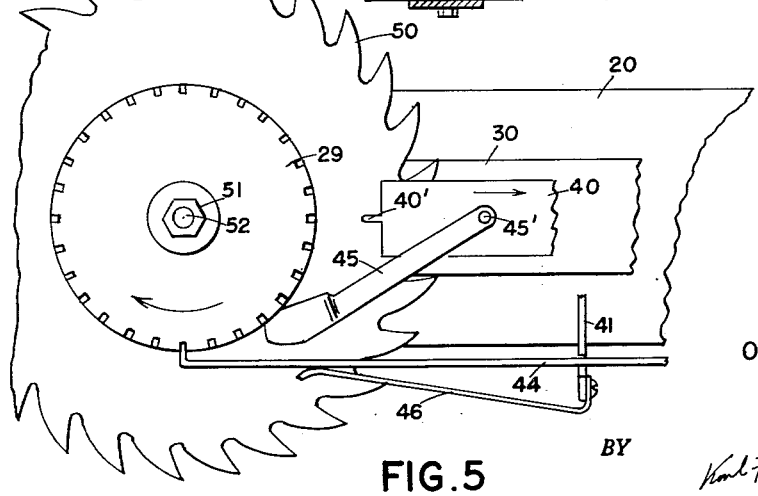
FIG. 5 is a top-plan view of the parts seen in the lefthand portion of FIG. 1, shown in a different operating position.

In operation, a saw blade 50 is assembled together with disc 29 and secured to plate 30 by nut 51. Handwheel 14 may now be turned to move blade 50 against grinding wheel 62 which has been previously actuated by the starting of motor 63. Motor 21 is then turned on by a suitable switch (not shown). The rotation of gear 22 and the consequent rotations of gears 24 and 26, in the directions indicated by arrows, initiate the following sequence of actions. Slider 40, whose slot 40' is engaged by pin 27 eccentrically secured to gear 24, is displaced rearwardly to withdraw its projection 40" from the previously engaged notch in disc 29. As gear 24 continues its rotation, pin 41 engages stop lever 32 at a point predetermined by the setting of that lever, thereby entraining the plate 30 on its rearward stroke and moving the blade 50 out of engagement with grinding wheel 62 upon further rotation of the gear 24. Concurrently with the disengagement of projection 40", stepping lever 45, having previously restrained the pawl 44 from entering any notch of disc 29, was withdrawn so as to permit pawl 44 to fall into the nearest notch of this disc under the urging of spring 46, as illustrated in FIG. 5. With pawl 44 remaining stationary during the subsequent forward displacement of plate 30 together with disc 29 and blade 50, the disc and the blade are rotated clockwise (as viewed in FIGS. 1 and 5). The combined translational and rotary motion of blade 50 causes its point of engagement with grinding wheel 62, designated P in FIG. 1A, to describe an arcuate path which is very nearly an arc of a circle centered on the tip of pawl 44. This arcuate path corresponds to the shape of the curved flank next to the one whose straight cutting edge has just been sharpened. Thus, the composite motion of the blade at this stage produces the necessary back rake and tooth shaping which heretofore generally required another machine.

As gear 24 continues its rotation, slider 40 reverses its direction precisely at the instant when the next cutting edge is aligned with the face 62' of grinding wheel 62. Upon this reversal, projection 40" is inserted into a new notch of disc 29, thereby locking both the disc and the saw blade in position; arm 45 cams the pawl 44 out of its notch as the unit 30, 29, 50 is driven rearwardly by the slider 40. With the blade 50 remaining in its indexed angular position, the machine proceeds to sharpen the front face of the next tooth. At this point, however, pin 28 has contacted the tripper cam 17b, thus tilting the platform 20 about its pivots 18a, 18b (see FIG. 4) and forming the fleam on the upper surface of that tooth, the cams 17a, 17b being suitably shaped to maintain the platform and the blade 50 at a constant angle throughout this operation. Gear 26 is advantageously provided with twice as many teeth as gear 25, so that pin 28 engages the tripper cams 17a, 17b during alternate operating cycles of slider 40 to tilt platform 20 in opposite directions whereby successive teeth are ground with relatively inverted fleam angles. As pin 28 passes tripper cam 17a or 17b, the platform 20 is returned by the action of restoring springs 90 to the horizontal position, shown in FIG. 3, in which ball check 89 snaps into its recess to hold the platform steady. Now the procedure described above is repeated. In this manner successive teeth may be completely ground, providing fleam or side rake on alternate sides of the tooth, back rake and tooth shape, and front-edge grinding thereof. It will be understood that no attention need be paid by the operator to the machine once operation has been initiated. Motor 21 may be provided with a switch actuated by disc 29 to cut off the motor and/or to signal the completion of the sharpening process by means well known per se.

Figure 3:
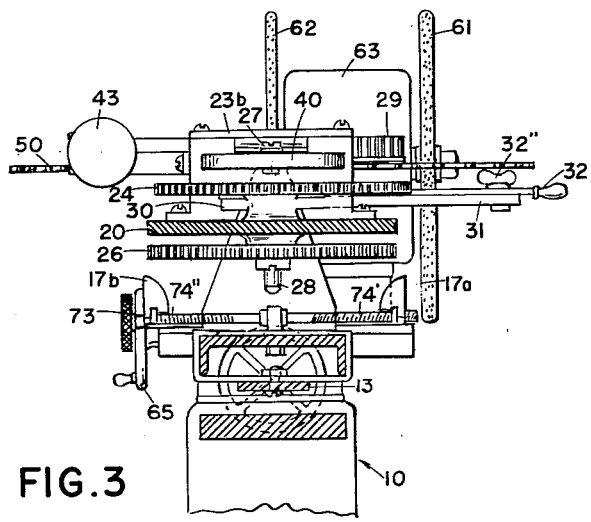
FIG. 3 is a cross-sectional view taken along line 3—3 of FIG. 2.

Handwheel 73 has been provided to regulate the fleam angle, as indicated on scale 72. Should it be desired to sharpen saws having no fleam, cams 17a, 17b may be backed off from contact with pin 28 as is shown in FIG. 3. The plate 80 may be raised to its dot-dash position (FIG. 2) to lock platform 20 in the horizontal position for transporting the machine.

The angle of the front face of a saw-blade tooth is adjustable by swiveling the beam 11 about fulcrum 81 on upright 83 and then securing the beam by the tightening of locking screw 84 against pin 82.

Grindstone assembly 60 is shown provided with two grinding wheels, wheel 62 for grinding fine-toothed blades and wheel 61 for grinding somewhat coarser blades. It will be understood that either of the wheels may be readily placed in an operative position by handwheel 65. As the grinding wheel is consumed, handwheel 67 may be turned to maintain the grindstone surface in proper position with respect to the saw-blade teeth. By virtue of the composite action of the saw-grinding machine according to my invention, the grinding wheel in contact with the saw blade is shaped by the sharpening operation, thus eliminating the need for grinding-surface facing or truing.

The stepping assembly may be used with a plurality of discs similar to disc 29 and interchangeable therewith, these discs having different numbers of notches respectively corresponding to the tooth divisions of various saw blades adapted to be ground upon the machine.

It will be readily apparent to persons skilled in the art that many of the co-operating elements shown and described may be modified to a greater or less extent without departing from the spirit and scope of my invention except as limited by the following claims. Thus, for example, the cams 17a, 17b may be so modified, with appropriate changes in the tooth ratio of gears 24 and 25, as to cause the fleam angle to change not between consecutive grinding operations but at larger intervals, e.g. after the sharpening of every other tooth.

I claim:

1. A saw-sharpening machine comprising a base, a support for a circular saw blade to be sharpened, said support being slidable on said base, mounting means for rotatably holding said blade on said support, an indexing member adapted to be rigidly coupled with said blade through said mounting means, said indexing member being provided with peripherally spaced formations corresponding in angular spacing to the teeth on said blade, detent means on said base limitedly displaceable to engage any of said formations, a grinding implement on said base, mechanism for reciprocating said support toward and away from said grinding implement, and control means for placing said detent means in engagement with successive formations on said indexing member during successive reciprocations of said support whereby a combined rotational and translational motion is imparted to the blade during at least part of said reciprocation; said mechanism comprising a reciprocable element on said base, drive means for continuously reciprocating said element, said element being provided with an extension positioned for locking engagement of a formation of said indexing member during non-engagement of said member by said detent means whereby said member is restrained against rotation, resilient means urging said detent means into locking engagement with said member, said element being provided with pusher means positioned to separate said detent means from said indexing member substantially concurrently with the re-engagement of said member by said extension, and a lost-motion connection between said element and said support for intermittent entrainment of the latter by the former subsequently to each engagement of said member by said extension.

2. A machine according to claim 1 wherein said indexing member is a notched disc of a diameter smaller than that of said blade and mounted for positioning concentrically therewith, said detent means comprising a pawl adapted to enter the notches of said disc.

3. A saw-sharpening machine comprising a base, a support for a saw blade to be sharpened, said support being pivotable about an axis and slidable on said base along said axis, grinding means on said base, displaceable mounting means for holding said blade on said support with one of the teeth of said blade operatively aligned with said grinding means in the direction of said axis, drive means for alternately advancing and retracting said mounting means toward and from said grinding means by reciprocating said support along said axis, control means coupled with said mounting means and synchronized with said drive means for operatively aligning successive teeth of said blade with said grinding means during successive reciprocating cycles of said support, tilting means synchronized with said drive means for inversely inclining said support with respect to said grinding means during successive reciprocating cycles whereby successive teeth will be ground with opposite fleam angles, and a cradle rockably suspended on said base and having said support slidably mounted thereon, said support being tiltable on said base together with said cradle; said tilting means comprising cam means on said base, a rotatable member on said cradle operatively connected with said drive means, and cam-engaging means eccentrically positioned on said rotatable member for intermittent coaction with said cam means; said cam means comprising two diametrically opposite cams positioned on opposite sides of said axis in the path of said cam-engaging means, said drive means being coupled with said rotatable member for rotating same at a rate of half a revolution for each reciprocating cycle of said support; said drive means comprising another rotatable member on said cradle, said other member being provided with a projection engaging a slot in said support for reciprocating the latter, said rotatable members being interconnected for rotation at a rate of one revolution of the first-mentioned rotatable member for two revolutions of said other rotatable member.

4. A machine according to claim 3, further comprising co-operating indicator means on said base and on said cradle for indicating the tilting angle of said support.

5. A saw-sharpening machine comprising a base, a platform swingably suspended on said base for tilting about a horizontal axis, a slider linearly displaceable on said platform in the direction of said axis, drive means on said platform for reciprocating said slider, a support linearly displaceable on said platform in the same sense as said slider, mounting means on said support for rotatably holding a circular saw blade to be sharpened, a disc engaged by said mounting means for rotation concentric and in unison with said blade, said disc being provided with peripheral notches corresponding in number and angular spacing to the teeth on said blade, grinding means on said base positioned adjacent said mounting means for operative engagement with successive teeth of said blade, a projection on said slider adapted to enter, in a forward position of said slider, a first notch of said disc diametrically opposite a tooth which is operatively aligned with said grinding means, detent means on said platform positioned for engagement of a second notch positioned substantially in quadrature with said first notch, said second notch being located substantially at the center of curvature of the rear flank of the operatively aligned tooth, pusher means on said slider for separating said detent means from said disc in said forward position, spring means urging said detent means into engagement with said second notch upon withdrawal of said slider toward a retracted position, abutment means on said slider and on said support contacting each other upon said withdrawal for rearwardly entraining said support during movement of said slider toward said retracted position, said aligned tooth presenting its rear flank to said grinding means upon such movement as the result of the engagement of said second notch by said detent means whereby said disc is rotated to position another notch in the path of said projection, said slider upon returning to said forward position arresting the rotation of said disc by said projection entering said other notch while simultaneously displacing said disc and said support toward said grinding means for sharpening the front face of the tooth, and tilting means controlled by said drive means for inclining said platform in opposite directions during successive forward motions of said slider, thereby producing opposite fleam angles on the front faces of successive teeth.

6. A saw-sharpening machine comprising a base, a support for a saw blade to be sharpened, said support being pivotable about an axis and slidable on said base along said axis, grinding means on said base, displaceable mounting means for holding said blade on said support with one of the teeth of said blade operatively aligned with said grinding means in the direction of said axis, drive means for alternatively advancing and retracting said mounting means toward and from said grinding means by reciprocating said support along said axis, control means coupled with said mounting means and synchronized with said drive means for operatively aligning successive teeth of said blade with said grinding means during successive reciprocating cycles of said support, tilting means synchronized with said drive means for inversely inclining said support with respect to said grinding means during successive reciprocating cycles whereby successive teeth will be ground with opposite fleam angles, a cradle rockably suspended on said base and having said support slidably mounted thereon, said support being tiltable on said base together with said cradle; said tilting means comprising cam means on said base, a rotatable member on said cradle operatively connected with said drive means, and cam-engaging means eccentrically positioned on said rotatable member for intermittent coaction with said cam means; and a manually operable means for retracting said cam means from contact with said cam-engaging means and for optionally stabilizing said cradle in a symmetrical position with respect to said grinding means.

References Cited in the file of this patent

UNITED STATES PATENTS

| 1,135,245 | Zuleg | Apr. 13, 1915 |
| 1,768,996 | Ransom | July 1, 1930 |
| 1,769,016 | Cunningham | July 1, 1930 |
| 2,619,851 | Moohl | Dec. 2, 1952 |
| 2,720,798 | Hedlund | Oct. 18, 1955 |

FOREIGN PATENTS

| 19,680 | Great Britain | Sept. 4, 1911 |
| 843,947 | Germany | July 14, 1952 |